J. BUCHLI.
DRIVING MECHANISM OF VEHICLES.
APPLICATION FILED AUG. 19, 1912.

1,141,764.

Patented June 1, 1915.

UNITED STATES PATENT OFFICE.

JACOB BUCHLI, OF BADEN, SWITZERLAND, ASSIGNOR TO AKTIENGESELLSCHAFT BROWN BOVERI & CIE., OF BADEN, SWITZERLAND.

DRIVING MECHANISM OF VEHICLES.

1,141,764.

Specification of Letters Patent.   Patented June 1, 1915.

Application filed August 19, 1912. Serial No. 715,948.

*To all whom it may concern:*

Be it known that I, JACOB BUCHLI, a citizen of the Swiss Republic, residing at Laendliweg 18, Baden, Switzerland, have invented certain new and useful Improvements in and Relating to the Driving Mechanism of Vehicles, of which the following is a specification.

This invention relates to the driving of vehicles more particularly in which motors are placed at some distance above the driving wheels and has for its object to provide a driving system lighter in weight and cheaper to construct than the usual systems.

The invention consists in a driving system for electrically driven vehicles with motors above the wheels, in which two motors act through the intermediary of suitably jointed coupling rods on a common point of the horizontal coupling rods connecting the driving cranks.

Figure 1:
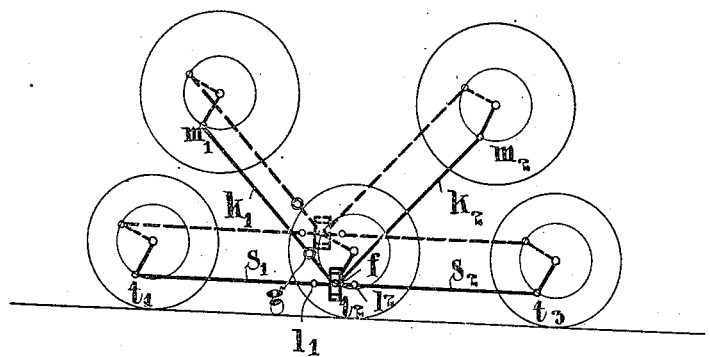
Figure 2:
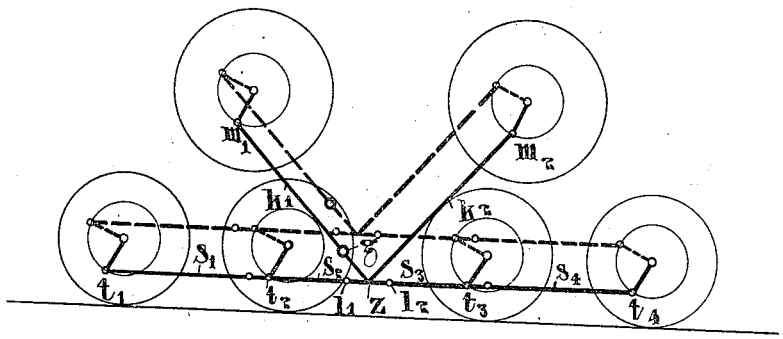

Referring to the accompanying diagrammatic drawings Figure 1 shows an example according to the present invention in which the motor connecting rods directly drive a crank connected with one of the live axles; Fig. 2 shows a modified form in which the rods are connected to a point between two cranks.

In the example illustrated in Fig. 1 $m_1$ and $m_2$ denote the two motor cranks which through the intermediary of the jointed coupling rods $k_1$ $k_2$ act on the central driving crank of the three driving cranks $t_1$ $t_2$ $t_3$ which are interconnected by horizontal coupling rods $s_1$ $s_2$. The coupling rod $k_2$ is provided at its lower end with the slotted guide $f$ in which the driving crank $t_2$ may move vertically up and down corresponding to the play of the spring of the corresponding driving or live axle, whereas the coupling rod $k_1$ is connected to $k_2$ by means of the link $g$ so as to avoid jamming in the slot $f$. The rods $s$ are provided with joints $l_1$ $l_2$ or equivalent means which allow of an independent play of the live or driving axles.

The simultaneous position of the driving rods on the other side of the vehicle is shown in dotted lines, the cranks being set substantially 90° apart.

The form of the invention shown in Fig. 2 is similar to that illustrated in Fig. 1 with the exception that in this latter figure the coupling rods $k_1$ $k_2$ do not act on a driving crank, but on any suitable point of the horizontal coupling rods $s$ connecting the driving cranks $t$ which point is situated between two driving cranks. The slot may in this case be dispensed with as at this point no elasticity in a vertical direction need be absorbed.

It will be understood that the specific forms described and illustrated are given as examples only.

Where the word "flexible" is used in the specification or claims it is to be understood in two ways, first, the two inclined rods $k_1$, $k_2$ may be connected together with the interposition of a joint ($g$) and second, it is possible to make one or other of the rods elastic so that the joint may be omitted. One of the two arrangements is required in order to avoid jamming in consequence of the wear of the bearings and inaccuracy in erecting.

Having now described my invention what I claim as new and desire to secure by Letters Patent is:—

1. A vehicle drive including two motors and three pairs of driving wheels, said motors being arranged above said wheels, a crank in connection with each of said motors and each of said wheels on one side of the vehicle and a further crank in connection with each of said motors and each of said wheels on the other side of the vehicle, said cranks being displaced by 90° in relation to one another, coupling rods connecting the wheel cranks respectively on each side of the vehicle and independently arranged coupling rods connecting the motor cranks on each side of the vehicle with said wheel crank coupling rods on each side of the vehicle; as set forth.

2. A vehicle drive including two motors and four sets of driving wheels, said motors being arranged above said wheels, a crank in connection with each of said motors and each of said wheels on one side of the vehicle and a further crank in connection with each of said motors and each of said wheels on the other side of the vehicle, said cranks being displaced by 90° in relation to one another, coupling rods connecting the wheel cranks respectively on each side of the vehicle and independently arranged coupling rods connecting the motor cranks on each side of the vehicle with a point between two wheel cranks in aforesaid wheel crank coupling rods; as set forth.

3. A vehicle drive comprising two motors, a plurality of driving wheels on each side of the vehicle, said motors being situated above said wheels, coupling rods for the driving wheels of each side, and means for independently transmitting the motion of both motors to the driving wheels on each side of the vehicle.

4. A vehicle drive comprising two motors and a plurality of driving axles, said motors being situated above said axles, means transmitting the motion of one axle to the other axles and means arranged independently of each other transmitting the motion of the two motors to one of said axles through mutually flexible coupling rods; as set forth.

5. A vehicle drive comprising a plurality of driving shafts and a plurality of driven shafts, means connecting the driven shafts of one side of the vehicle said means including a flexible connection and means connecting the driven shafts of the other side of said vehicle, said means also including a flexible connection and displaced through an angle with relation to said means, further means connecting one of the driving shafts with a point in the means connecting the driven shafts on each side of the vehicle respectively and independent means also on each side of the vehicle flexible with respect to said further means connecting the other driving shaft to the same points in the connections between the driven shafts; as set forth.

In testimony whereof, I affix my signature in presence of two witnesses.

JACOB BUCHLI.

Witnessses:
CARL GUBLER,
AUGUST RUEGG.